(12) United States Patent
Phillips et al.

(10) Patent No.: US 7,057,805 B2
(45) Date of Patent: Jun. 6, 2006

(54) SOLAR CONTROL FILM CONTAINING CARBON BLACK AND PROCESS FOR PREPARING THE SOLAR CONTROL FILM

(75) Inventors: Stephen N. Phillips, Union Hall, VA (US); George L. Quinlan, Bassett, VA (US)

(73) Assignee: Commonwealth Laminating & Coating, Inc., Martinsville, VA (US)

( * ) Notice: Subject to any disclaimer, the term of this patent is extended or adjusted under 35 U.S.C. 154(b) by 592 days.

(21) Appl. No.: 09/982,813

(22) Filed: Oct. 22, 2001

(65) Prior Publication Data

US 2003/0076582 A1    Apr. 24, 2003

(51) Int. Cl.
*G02B 5/08* (2006.01)
*F21V 9/06* (2006.01)

(52) U.S. Cl. .................. 359/360; 359/361; 428/402

(58) Field of Classification Search ............... 359/350, 359/359–361; 428/98, 212, 221, 424, 428, 428/432, 450, 458, 204, 207; 524/31, 424, 524/733
See application file for complete search history.

(56) References Cited

U.S. PATENT DOCUMENTS

| | | | | |
|---|---|---|---|---|
| 3,907,727 A | * | 9/1975 | Lipp | ............................ 524/733 |
| 4,081,300 A | | 3/1978 | Willdorf | |
| 4,157,417 A | | 6/1979 | Murphy | |
| 4,557,980 A | | 12/1985 | Hodnett, III | |
| 4,634,637 A | | 1/1987 | Oliver et al. | |
| 4,797,317 A | | 1/1989 | Oliver et al. | |
| 4,799,745 A | | 1/1989 | Meyer et al. | |
| 4,963,206 A | | 10/1990 | Shacklette et al. | |
| 5,055,358 A | | 10/1991 | Livingston et al. | |
| 5,071,206 A | | 12/1991 | Hood et al. | |
| 5,114,783 A | | 5/1992 | Hodnett, III | |
| 5,254,395 A | | 10/1993 | Hodnett, III | |
| 5,401,541 A | | 3/1995 | Hodnett, III | |
| 5,513,040 A | | 4/1996 | Yang | |
| 5,683,805 A | | 11/1997 | Oita et al. | |
| 5,756,197 A | | 5/1998 | Statz et al. | |
| 5,784,853 A | | 7/1998 | Hood et al. | |
| 5,925,453 A | | 7/1999 | Kase et al. | |
| RE36,308 E | | 9/1999 | Yang | |
| 5,954,386 A | | 9/1999 | Thomas | |
| 5,956,175 A | | 9/1999 | Hojnowski | |
| 5,972,453 A | | 10/1999 | Akiwa et al. | |
| 6,007,901 A | | 12/1999 | Maschwitz et al. | |
| 6,034,813 A | * | 3/2000 | Woodard et al. | ............ 359/360 |
| 6,120,901 A | * | 9/2000 | Ojeda | ......................... 428/421 |
| 6,123,986 A | | 9/2000 | Maschwitz et al. | |

* cited by examiner

*Primary Examiner*—Audrey Chang
(74) *Attorney, Agent, or Firm*—Buchanan Ingersoll PC

(57) ABSTRACT

A solar control film which includes an adhesive layer for adhering the solar control film to a substrate, a metallized layer and a scratch resistant layer containing dispersed carbon black particles wherein the metallized layer is between the adhesive layer for adhering to a substrate and the scratch resistant layer. The solar control film can be prepared by a process which involves mixing a composition comprised of carbon black in particulate form dispersed in a nitrocellulose resin with a polymer forming material to form a coating composition and applying the coating composition to a component of a solar control film whereby the coating composition forms a scratch resistant layer containing dispersed carbon black particles.

24 Claims, 1 Drawing Sheet

SOLAR CONTROL FILM CONTAINING CARBON BLACK AND PROCESS FOR PREPARING THE SOLAR CONTROL FILM

BACKGROUND OF THE INVENTION

A. Field of the Invention

The present invention relates to a solar control film comprised of several layers including a scratch resistant layer containing dispersed carbon black particles. The present invention further relates to a process for preparing the solar control film using a resin composition containing dispersed pigment particles to form the scratch resistant layer.

B. Description of the Related Art

In order to reduce the transmittance of infrared, visible and ultraviolet radiation through the window of a building or vehicle, the art has developed a variety of different products which can be adhered to planar or curved windows. The products, often referred to as solar control films or sheets, alter the solar energy transmission, reflection, and absorption of the window. The most common function is to reduce solar heat gain thereby improving comfort and reducing cooling load within an architectural structure or a vehicle. Some solar control films or sheets are designed so that the surface of the sheet facing away from the rigid window to which the sheet is attached has high thermal infrared reflectivity. Such low emissivity sheets reduce thermal energy loss through glazing and contribute to reduction of heating energy requirements when outdoor temperatures are below indoor temperatures in a building or vehicle.

Solar control sheets may be categorized into three basic types. The simplest sheets reduce light transmission evenly in the visible and infrared wavelengths. These sheets are not considered spectrally selective, and usually contain one thin film layer consisting of an optically neutral nickel alloy. The second type of solar control sheet uses an infrared reflecting metal such as aluminum, copper or silver as a thin film layer and the reflection level in the infrared wavelengths is increased in these sheets making them somewhat spectrally selective. The third type of solar control sheet also contains infrared reflecting metals, but makes use of thin optical interference layers as well.

An illustrative solar control window film consists of a substantially transparent flexible polymer substrate having a thin layer of reflective metal deposited thereon, for example, by vapor deposition or sputter deposition. The film is customarily affixed to the interior surface of a window by a substantially transparent layer of pressure sensitive adhesive. The adhesive customarily contains ultraviolet energy absorbers to protect the contents of the room or space from ultraviolet damage.

Depending upon the selection of the metal or metals and the thickness of the metal layer, the film will have a selected visible light transmission (VLT) and a selected visual light reflection (VLR). In general, VLT and VLR are inversely proportional. If the thickness of the metal layer is increased, VLR is increased and VLT is decreased. In order to achieve an acceptable level of solar energy rejection in most climates, the metal layer must be sufficiently thick and dense that visible light transmission is below 50%, frequently 25% or less. Thus, VLT and VLR become competing interests without a middle of the road compromise acceptable to the industry.

One attempt to increase the VLT of metal films has been to apply coatings of titanium oxide or indium tin oxide adjacent the film or layer of metal to control reflection within a narrow spectral band. According to the principles of optics, sandwiching of the metal film between layers of a material of high refractive index can boost visible transmission, that is, so-called induced transmission. This typically requires 70 to 100 nanometer thick layers of titanium oxide or indium tin oxide, which are very slow to produce and difficult to control. As a result, this approach is generally too expensive to be practical for many window film applications.

U.S. Pat. No. 4,799,745 discloses an infrared reflecting film employing Fabry-Perot interference filters comprised of five or more odd numbers of alternating layers of dielectric and metal. For instance, two or more optically transparent layers of metal, such as silver, gold, platinum, palladium, aluminum, copper, nickel and alloys thereof, are sandwiched between and separated by directly contiguous dielectric spacer layers, which may be oxides of indium, tin, titanium, silicon, chromium and bismuth. U.S. Pat. No. 5,071,206, which issued on a continuation in part of U.S. Pat. No. 4,799,745, discloses a color corrected infrared reflecting film comprised of a substrate bearing seven directly contiguous alternating layers of dielectric and silver. While these films provide the desired visible light transmission, they require 5, 7 or a greater odd number of layers of material sputter deposited onto one another, which is very costly and not easy to achieve.

U.S. Pat. Nos. 4,799,745 and 5,071,206 seek to maximize infrared reflection which, when the film is affixed to a window or employed in a glazing system, causes the reflected infrared energy to be absorbed in the window. Excessive absorption of solar heat can result in breakage of the window. Another disadvantage of this approach is the inherently low moisture vapor transmission rate (MVTR) of the metal/dielectric stack, which typically results in excessively long drying times for the pressure sensitive adhesive attachment or installation system employed to affix the film to a window. In many cases, this can result in fogginess or haze which can disrupt window aesthetics after installation.

U.S. Pat. No. 5,956,175 describes a further arrangement for inhibiting infrared transmission. One disclosed structure includes a substrate having a layer of metal on one side thereof which is adhesively laminated to a clear polymer sheet so that the sheet overlies and protects the metal layer. The exposed surface of the polymer sheet bears a scratch resistance protective hard coat and the exposed other side of the substrate bears a pressure sensitive adhesive for affixing the substrate to a window. In this structure, the near infrared energy absorbing material may optionally be incorporated in the pressure sensitive adhesive, incorporated in or coated onto the substrate, dispersed in the laminating adhesive, incorporated in or coated onto the polymer sheet, dispersed in the hard coat material and/or applied to the substrate as a prime coat under the metal layer and/or to the polymer sheet as a prime coat under the hard coat.

Another approach to selective filtering of the solar spectrum has been through the use of near infrared absorbing dyes. One example is a film incorporating or coated with infrared absorbing dyes that are available from commercial sources, such as Nippon Kayaku Kabushiki Kaisha of Japan. One potential drawback of dyes is that they tend to fade over time. Glass manufacturers have also employed inorganic oxides to absorb solar heat. Examples include PPG Industries "Azurelite" glass and Libby Owens Ford "Evergreen" glass. Again, due to solar heat absorption, very high glazing temperatures are reached, promoting glass breakage, decreasing dual pane insulated glass lifetime, causing sealant failure, and producing an overall inefficient system.

U.S. Pat. No. 5,925,453 describes a window film that is particularly designed for curved glass windows and which minimizes the reflection of infrared rays and reduces the intensity of condensed infrared rays. The window film comprises a light reflecting layer and an infrared absorbing layer with the light reflecting layer inside and the infrared absorbing layer outside. The infrared absorbing layer has a visible light transmittance of 50 percent or more, preferably 60 percent or more. The infrared absorbing agent in the layer can be an organic material, exemplified by phthalocyanines, naphthalocyanines and anthraquinones, or an inorganic material, exemplified by various metal oxides having a particles size in the range of between about 0.005 and about 1 micrometer. The window film is applied to the window via an adhesive layer.

U.S. Pat. No. 5,683,805 describes a colored film formed of a transparent film and at least one colored adhesive layer arranged on one side of the transparent film. The adhesive layer has been colored by a colorant composed of a pigment and a dispersant. The dispersant comprises a (meth)acrylate ester polymer formed, as essential monomer components, of an aromatic vinyl monomer, a primary to tertiary amino-containing (meth)acrylate ester monomer and a (meth)acrylate ester monomer containing an ammonium group quaternized with an aromatic compound. The colorant can be an organic pigment (dye) or an inorganic pigment exemplified by carbon black, metal oxides and metal powders. The separate preparation of the dispersant including the equipment necessary for its preparation constitute significant disadvantages.

U.S. Pat. No. 4,634,637 discloses a solar control film in the form of a composite sheet for use on the inside surface of a motor vehicle window. The composite sheet comprises a first optically clear polymeric stratum having a layer of an alloy of nickel and chromium applied by conventional vacuum deposition to one of its surfaces and having a stripe of stainless steel applied by conventional vacuum deposition over the nickel-chromium layer to one edge of the first polymeric stratum, the nickel chromium alloy layer having a density great enough to reduce the visible light transmission value to about 50–70% and the stainless steel stripe having a density great enough to give a combined visible light transmission with the nickel chromium layer of about 21%. The composite sheet has a second optically clear polymeric stratum having a stripe of an alloy of nickel and chromium applied by conventional vacuum deposition along one side to one edge of the second stratum and having a density great enough to reduce the visible light transmission value through the striped portion to about 35%. The first polymeric stratum is bonded to the second polymeric stratum with the stripe of stainless steel and the stripe of nickel chromium alloy next to and facing each other, the light transmission value of the stainless steel nickel chromium stripe with the nickel chromium layer being about 8 to 12%, the bonding comprising an optically clear adhesive. The sheet further has an optically clear adhesive layer for mounting the composite sheet with the second polymeric stratum to the inside surface of a motor vehicle window.

BRIEF SUMMARY OF THE INVENTION

In one aspect, the present invention provides a solar control film comprising: a) an adhesive layer for adhering the solar control film to a substrate; b) a metallized layer; and c) a scratch resistant layer containing dispersed carbon black particles wherein the metallized layer is between the adhesive layer for adhering to a substrate and the scratch resistant layer.

In another aspect, the present invention provides a process for preparing a solar control film comprising mixing a composition comprised of carbon black in particulate form dispersed in a nitrocellulose resin with a polymer forming material to form a coating composition and applying the coating composition to a component of a solar control film comprised of an adhesive layer for adhering the solar control film to a substrate and a metallized layer whereby the coating composition forms a scratch resistant layer containing dispersed carbon black particles.

DETAILED DESCRIPTION OF THE INVENTION

Figure 1:
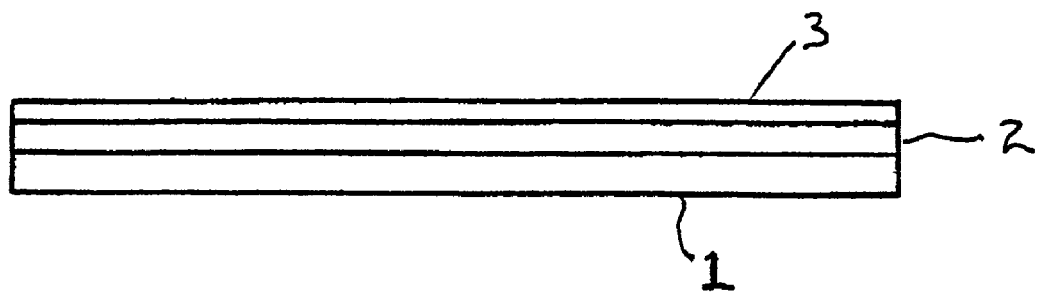
FIG. 1 is a sectional view of one embodiment of the solar control film of the present invention.

As noted above, one aspect of the present invention relates to a solar control film. With reference to the embodiment illustrated in FIG. 1, the solar control film comprises an adhesive layer 1, a metallized layer 2 and a scratch resistant layer 3 which contains dispersed carbon black particles.

The adhesive layer is selected to adhere the solar control film to a substrate which is typically the inside of a window of a building or the inside of a window or windshield of a vehicle, such as an automobile, boat or airplane. The adhesive layer can be any material which serves this function. For instance, known adhesives can be a pressure-sensitive adhesive, a heat-sensitive adhesive, a dry adhesive that is activated by water or an autohesive, all of which are known in the art. Examples of pressure-sensitive adhesives include adhesives based on acrylic compounds, rubber compounds, polyvinyl ether compounds and silicone compounds. As one example, an acrylic pressure-sensitive adhesive can be obtained by copolymerizing in an organic solvent an alkyl-containing (meth)acrylate ester and a polymerizable unsaturated carboxylic acid or an ethylenically unsaturated hydroxyl-containing monomer, and optionally a copolymerizable vinyl monomer. There are a number of such known pressure-sensitive adhesives which are commercially available such as adhesives available from Solutia of St. Louis, Mo. under the designation GMS-263 and Ashland Speciality Chemical under the designation Aeroset 458.

Heat-sensitive adhesives refer to those adhesives which exhibit no adhesive tack at room temperature, but exhibit adhesive properties when heated. Such adhesives are also referred to as hot-melt adhesives or heat-sealing agents. Examples of heat-sensitive adhesives include materials containing as a base polymer an ethylene-vinyl acetate copolymer, an ethylene-ethyl acrylate copolymer, an ethylene-acrylic acid copolymer, a polyamide resin, a polyester resin, a rubbery styrene-butadiene-styrene copolymer, a rubbery styrene-isoprene-styrene copolymer or the like. Heat-sensitive adhesives are also known in the art and are commercially available.

Dry adhesives that are water-activated are materials which are applied as a liquid and permitted to dry to form a thin film which does not exhibit adhesive tack. When wetted with water, the film develops adhesive properties and can be used to bond the solar control film to a substrate. Water-activated adhesives are also known in the art with an exemplary commercially available material being Morton 89R3.

Autohesives refer to materials which can adhere to a smooth surface by making use of air tightness available between mirror surfaces, that is, the smooth surface of the object and the surface of the autohesive. The solar control film with the autohesive applied thereon can be easily peeled without staining the film and can be repeatedly removed, such as in order to reposition the solar control film, and then readhered. Examples of autohesives include materials containing as a base polymer an ethylene-base copolymer, such as an ethylene-vinyl acetate copolymer or ethylene-ethyl acrylate copolymer, an ethylene-α-olefin copolymer (sometimes referred to as L-LDPE), a soft vinyl chloride resin, an acrylic resin, a rubber-based resin, a urethane resin or an olefin resin.

In the present invention, pressure sensitive adhesives and dry adhesives that are water-activated are preferred. In order to protect the adhesive layer, a release liner (not shown in FIG. 1) can be used as is well known in the art. Typically, the release liner is a silicone material or polyolefinic material, such as polypropylene film available from Mitsubishi Chemicals under the designations 25LR and 45LR, that adheres to and protects the adhesive layer, but which can be readily removed therefrom so that the adhesive layer is exposed and can be applied to the intended surface, such as a window. The adhesive layer may also contain a colorant in the form of a dye or pigment which can complement the carbon black in the scratch resistant coating. For instance, dyes include phthalocyanine dyes, azo dyes, condensed azo dyes, azo lake dyes, anthraquinone dyes, perylene/perinone dyes, indigo/thioindigo dyes, isoindolinone dyes, azomethineazo dyes, dioxazine dyes, quinacridone dyes, aniline black dye, triphenylmethane dyes while pigments can include titanium oxide, iron oxide, iron hydroxide, chrome oxide, spinel-form calcination pigment, chromic acid, chrome vermilion, iron blue, aluminum powder, bronze powder pigments and carbon black. In view of the carbon black in the scratch resistant layer, the dye or pigment in the adhesive layer is optional and to the extent that it is present, it can be reduced to levels below those used in conventional solar control films containing a colorant in the adhesive layer.

The adhesive is applied in an amount and manner well known in the art. For instance, a pressure sensitive adhesive can be applied in an amount of approximately 4 lbs. per ream (3000 ft$^2$) by a conventional coating apparatus.

The use of a metallized layer provides certain benefits to a solar control film in terms of reduced transmission of visible light and infrared radiation. The metallized layer can be in any form known in the art to provide these functions. For instance, the metallized layer can be a transparent support on which is provided a thin metallic layer in a manner well known in the art. For example, U.S. Pat. No. 5,513,040, the contents of which are incorporated by reference, describes a number of metals coated onto a polymer substrate for use in solar control films. These materials include a polymer substrate coated with a single layer of metal, namely, titanium (Ti), stainless steel (SS), or inconel or nichrome (NiCr), and a material with a plural layer film with a thin layer of stainless steel, a thin layer of copper and a thin layer of stainless steel. Nickel-chromium is another material that is know to be applied to a polymeric substrate.

In the context of the present invention, the preferred metallized layer is aluminum that is vapor or vacuum deposited or sputtered onto a polymeric substrate. Aluminum deposited metallized layers that can be used in the present invention are commercially available from a variety of sources, such as from CP Films, Inc. of Martinsville, Va. and VDI of Louisville, Ky.

While the metallized layer can substantially reduce visible light transmission, it provides a high level of internal reflection. While this can be of annoyance to the occupants of a building trying to view outside the building when the external light conditions are low, such as during the evening or under overcast conditions, it can be dangerous if such a solar control film is applied to the inside of automobile windshield and it inhibits the driver's vision. Visible light reflectance can be reduced by reducing the amount of metal, but such reduction is accompanied by an increase in visible light transmission. By incorporating carbon black into the scratch resistant layer, the visible light reflectance can be substantially reduced while also attaining improved absorption of both infrared and ultraviolet radiation. In addition, the carbon black provides an aesthetically pleasing tint to the solar control film that does not fade over time compared to organic dyes which typically have an effective life of approximately three years.

Scratch resistant layers are well known in the art and are designed to protect the underlying layers of the solar control film. The scratch resistant layer is typically composed of polymeric material that has a high surface hardness. For instance, the polymeric material can be selected such that it meets the standards of ASTM D-627. It may also be useful if the layer has other advantageous properties, such as solvent resistance, so that it meets other standards, such as ASTM F-548 and D-2197. Illustrative polymer forming materials include materials that can be reacted to form acrylic resins (which include methacrylic resins) which are commercially available. One such material is a mixture of pentaerythritol triacrylate esters and pentaerythritol tetraacrylate esters sold under the designation SR-295 from Sartomer Company, Inc. of Exton, Pa. Another material is Ebecryl 3720 (an acrylated epoxy compound) available from UCB Chemicals Corp. of Smyrna, Ga. The materials are typically combined with initiators and curing agents, such as Darocur 1173 which is 2-hydroxy-2-methyl-1-phenyl-propan-1-one available from Ciba Speciality Chemicals, Irgacure 184 which is 1-hydroxy-cyclohexyl-phenyl-ketone also available from Ciba Speciality Chemicals, and Rapi-Cure DVE-3 which is 3,6,9,12-tetraoxatetradeca-1,13-diene available from ISP Technologies Inc. of Wayne, N.J.

The carbon black that is dispersed in the scratch resistant coating is in finely dispersed form whereby the carbon black powder has an average particle size in the range of from about 0.2 to about 5.0 microns, preferably from about 0.2 to about 0.5 microns. The carbon black is present in the scratch resistant coating in an amount of from about 1.0 to about 10%, preferably from about 2.0 to about 3.0% by weight based on the total weight of the material forming the scratch resistant coating.

It has been found to be effective to incorporate the carbon black into the materials forming the scratch resistant coating by using a dispersion of the carbon black powder in a composition containing a resin and a solvent. A particularly useful dispersion contains carbon black dispersed in a composition which contains a nitrocellulose resin and a solvent. Such a dispersion is commercially available under the designation 6B380 from Penn Color Inc. of Doyleston, Pa. that contains 8.0% carbon black, 20.6% nitrocellulose resin and 71.4% solvent, all percentages being by weight of the overall dispersion. The dispersion is then incorporated into the materials which will form the scratch resistant coating.

As an illustration of the preparation of a carbon black-containing scratch resistant coating, a mixture of SR-295 and Ebecryl 3720 can be blended in a stainless steel mixer in a 13:2 weight ratio for about 5 minutes, initiators can be added (Darocur 1173 and Igicure 184) with mixing continued for about 10 minutes. To this mixture is added the carbon black dispersed in a nitrocellulose resin (Penn Color 6B380) in an amount of from 5% to about 40% by weight, preferably from about 25% to about 30% by weight of the total mixture. The amount of the carbon black dispersion can be selected depending on the desired optical characteristics of the solar control film. A typical amount is about 28% by weight of the total mixture which provides a carbon black content of about 2.25% by weight. Mixing is continued for about 45 to 60 minutes.

To the mixture is added the Rapi-Cure DVE-3 in an amount of about 6% by weight of the total mixture and mixing is continued for about 5 minutes. Organic solvent is next added to the mixture. A typical solvent is a 50/50 weight mixture of toluene and methyl ethyl ketone in a total amount that is about equal to the amount of the acrylic monomer solution and mixing is continued for approximately another 5 to 10 minutes.

The resulting mixture is then combined with the components typically used to form a scratch resistant layer. Thus, for example, the mixture can be combined in an amount of from about 35% by weight to about 50% by weight, preferably about 35% to about 45% by weight based on the weight of the components used to form the scratch resistant layer. One illustrative instance provides the addition of 40 lbs. of the carbon black containing mixture is added to 100 lbs. of a combination of organic solvents (e.g., toluene and methyl ethyl ketone), initiators, flow agent (e.g., DC-29 available from Dow Corning), SR-295 and Ebecryl 3720 which are in a total amount of approximately 23% by weight of the mixture (i.e., before the carbon black dispersion is added).

As an alternative, the initiators can be separately mixed with an organic solvent (e.g., toluene), optionally with other component(s), such as the flow control agent, and this mixture added with the carbon black-containing mixture and the mixture of other components forming the scratch resistant layer. The overall mixture is then further mixed for an additional approximately 5 to 10 minutes.

By utilizing this procedure, a substantial advantage can be attained in that carbon black particles can be effectively dispersed in the scratch resistant layer without the occurrence of haze or other aesthetically disadvantageous characteristics. In addition, the mixture can be used in conventional coating machines which is a significant advantage in the art.

The final mixture can be applied to the metallized film in an amount of from about 1 to about 2 lbs. per ream (dry weight) using a conventional applicator, such as a knife-over-roll coater, a roll coater, a reverse roll coater or a gravure coater. While the film can be prepared in batches, it is preferably continuously prepared where the film can be passed through heated zones at approximately 140 to 160° F. (60 to 72° C.) for several seconds. If a photoinitiator is present, the film can also be briefly exposed to ultraviolet radiation. Depending on the amount of the carbon black-containing mixture used, the visible light transmission of the scratch resistant layer can be on the order of from about 70 to about 80%.

To apply the mounting adhesive layer 1, a conventional applicator can be used (e.g., a twin roller) which applies the adhesive and the release film.

Figure 2:
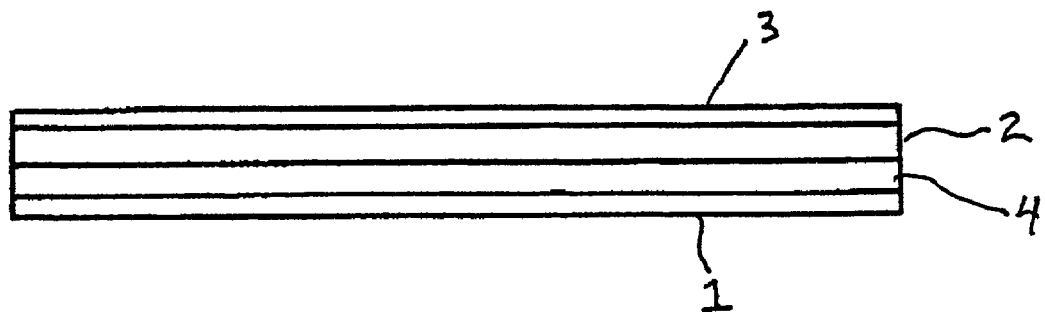
FIG. 2 is a sectional view of further embodiment of the solar control film of the present invention which includes a clear film.

In a more preferred embodiment of the invention illustrated in FIG. 2, a clear film 4 is present between the metallized layer 2 and the mounting adhesive layer 1. The clear film can be any suitable material, but is typically a polymeric film and usually a polyester film having a thickness of from about 0.4 to about 1.0 mil (10 to 26 micron). An especially suitable polymer is polyethylene terephthalate and such film is commercially available from sources such as DuPont of Towanda, Del. or Mitsubishi Polyester Film LLC of Greer S.C. Alternatively, a film containing a ultraviolet absorber can be used. Such a film is also commercially available such as from CP Films of Martinsville, Va.

To prepare this embodiment of the solar control film, the film is laminated to the metallized film by applying a conventional laminating adhesive to the metal surface and adhering the film to it. The adhesive can be a heat activated adhesive, such as a polyester heat activated adhesive available from Rohm & Haas under the designation 76R36B, which is applied to the metal surface of the metallized film, placed in an oven at approximately 180 to 200° F. (162 to 183° C.) with the film then attached by passing it through a heated two roll mill. The carbon black-containing scratch resistant layer 3 and the mounting adhesive layer 1 can then be applied as previously described. In the event that a polymer film containing an ultraviolet absorber is used, one can use a dry adhesive, such as available from Morton International, Inc. (now a subsidiary of Rohm & Haas of Philadelphia, Pa.) under the designation 89R3 and a polypropylene release liner which is commercially available. A variation of this embodiment is to provide the polymer film between the metallized layer and the scratch resistant layer. In this embodiment, the scratch resistant layer would be applied to the polymer rather than to the metallized layer.

Figure 3:
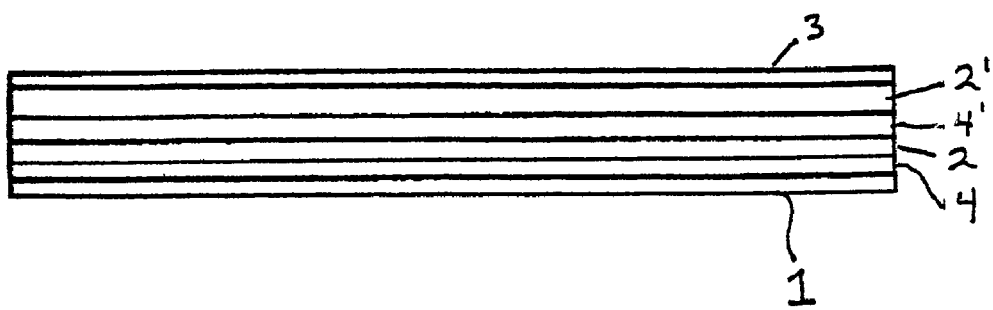
FIG. 3 is a sectional view of a still further embodiment of the solar control film of the present invention which includes a further metallized layer.

The embodiment of the invention illustrated in FIG. 3 provides a further enhancement of solar properties. In this embodiment, a further metallized layer 2' is present which can be the same or different from metallized layer 2. To avoid an interference pattern that can provide a disadvantageous "rainbow" pattern, a film 4' is present between the two metallized layers. The film 4' can be the same or different from film 4 which is the same type of film discussed above with respect to the embodiment illustrated in FIG. 2. As is apparent, further layers can be added. The layers can be attached using the laminating procedure discussed above. Thus, for instance, the metallized layer 2 and the film 4 can be adhered together in the manner discussed above with respect to the embodiment illustrated in FIG. 2 and the same can be conducted with regard to metallized layer 2' and film 4'. The respective laminates can then be adhered together with an adhesive before being provided with the scratch resistant layer 3 and the mounting adhesive layer 1.

The use of colorants in solar control films is well documented. As noted above, the art has described a number of organic dyes which have been incorporated into various layers, particularly adhesive layers. Although organic dyes are generally easy to disperse into the composition forming the layer, they tend to fade over time and have poor solar properties. For instance, layers which include organic dyes do not block ultraviolet radiation and therefore are often accompanied by a separate ultraviolet absorber.

The present invention is a substantial advance in the art in that it can provide a solar control film which effectively reduces visible light and infrared transmission without distortion and reduced internal reflection. For instance, depending on the amount of carbon black used, the solar control film can exhibit a visible light transmission of from about 10 to about 80%, preferably from about 35 to about 70 (as measured by MacBeth 9D904) and a visible light reflectance of from about 0 to about 8%, preferably from about 2 to about 5%. In addition, the carbon black provides a pleasing gray color and, in contrast to known organic dyes, does not fade over time and does not significantly create haze. In this latter regard, the haze of the solar control film is less than about 7%, preferably less than about 5% which is a substantial advantage over know solar control films which have higher haze values.

The following Examples illustrate various aspects of the present invention. It is to be understood that the present invention is defined by the appended claims and not the specific details of the Examples.

EXAMPLE 1

Into a 25 gallon stainless steel Cowles mixer are introduced 26 pounds of SR-295 and 4 pounds of Ebecryl 3720 and mixing is conducted for about 5 minutes. One pound of Darocur 1173 and one pound of Irgacure 184 are then added and mixing is continued for about 10 minutes. To this mixture is added 12.5 pounds of Penn Color 6B380 and mixing is continued for about 45 to 60 minutes.

To the mixture is then added 2.6 pounds of Rapi-Cure DVE-3 and mixing is continued for about 5 minutes. A 50/50 weight mixture of toluene and methyl ethyl ketone in a total amount of 24 pounds is added to the mixture and mixing is continued for approximately another 5 to 10 minutes to provide the carbon black containing additive composition.

Into a lined 55 gallon drum provided with a portable agitator is first introduced 226 pounds of toluene followed by 73.3 pounds of SR-295, 10.7 pounds of Ebecryl 3720 and 7.4 pounds of Rapi-Cure DVE-3. In a separate mixer, 3.7 pounds of Darocur 1173 and 3.7 pounds of Irgacure 184 are combined with 45 pounds of toluene which is then mixed for about 10 minutes and 30 grams of DC-29 are then added. The content of the separate mixer is then added to 55 gallon drum and the overall mixture is then mixed for about 10 minutes.

The formed mixture is then blended with 37 pounds of the carbon black containing mixture in a 55 gallon drum equipped with a mixer to form a composition for forming a scratch resistant layer. The composition is formed into a film by applying it in on the back surface of a commercially available one mil thick aluminum vacuum deposited polyester film using a rotating gravure cylinder, passing it through an oven so that the film passes through a first zone at 145° F. (63°) for 1–2 seconds and a second zone at 155° F. (68° C.) for 1–2 seconds. The film is then exposed briefly to ultraviolet lights sufficient to activate the photoinitiators.

The resulting scratch resistant layer has a dry weight in the range of 1.2–1.5 pounds per ream (3000 ft$^2$). The laminate is then provided with an adhesive and a release film by passage through twin rollers so as to obtain the arrangement illustrated in FIG. 1.

EXAMPLE 2

The process of Example 1 is repeated except that the aluminized film is first laminated to a commercially available 0.5 mil clear polyester film by coating the aluminum surface with a commercially available heat activatable polyester adhesive, placing the film in an oven at 180–200° F. (82–93° C.) and then adhering it to the clear polyester film by passing the two films through a heated two roll mill.

The carbon black-containing composition is then applied to the back surface of the aluminized film to form the scratch resistant layer. On the remaining side of the clear polyester film is applied a mounting adhesive which GMS 263 in an amount of 4 pounds per ream. The adhesive is provided with a silicone release liner to provide an arrangement illustrated in FIG. 2.

EXAMPLE 3

The process of Example 2 is repeated except that the clear film contains an ultraviolet absorber and is commercially available from CP Films under the designation "Clear Weatherable" and the mounting adhesive is a water activated adhesive commercially available from Morton Chemicals under the designation 89R3 in an amount of 2 pounds per ream. The adhesive is covered by a polypropylene release liner. This embodiment also has an arrangement illustrated in FIG. 2.

EXAMPLE 4

The arrangement illustrated in FIG. 3 can afford reduced visible light transmission, but reduced visible light reflection. In this arrangement, at least two metallized layers are present, such as commercially available nichrome films available from VDI of Louisville, Ky. To prevent optical interference, a clear film 4' having a thickness of 0.4 to 1 mil can be placed between the metallized layers 2 and 2' and adhered using a commercially available adhesive of the types discussed above. If desired, the adhesive can contain a dye or pigment. The carbon black-containing composition forms the scratch resistant layer in the manner described above and a the application of mounting adhesive layer 1 completes the solar control film.

Although the present invention has been described with reference to certain preferred embodiments, it is apparent that modifications and variations thereof may be made by those skilled in the art without departing from the scope of the invention as defined by the following claims.

What is claimed is:

1. A solar control film comprising:
   a) an adhesive layer for adhering the solar control film to a substrate;
   b) one or two metallized layers; and
   c) a scratch resistant layer containing dispersed carbon black particles wherein the one or two metallized layers are between the adhesive layer for adhering to a substrate and the scratch resistant layer.

2. The solar control film of claim 1 wherein the adhesive layer comprises a pressure sensitive adhesive.

3. The solar control film of claim 1 wherein the adhesive layer comprises a dry adhesive.

4. The solar control film of claim 1 wherein a releasable liner is present on the adhesive layer.

5. The solar control film of claim 1 wherein the metallized layer is comprised of aluminum deposited on a polymeric substrate.

6. The solar control film of claim 5 wherein the polymeric substrate comprises polyethylene terephthalate.

7. The solar control film of claim 1 wherein the scratch resistant layer comprises from about 1 to about 10% by weight of the carbon black particles.

8. The solar control film of claim 1 wherein the scratch resistant coating comprises from about 2 to about 3% by weight of the carbon black particles.

9. The solar control film of claim 1 wherein the carbon black particles have an average particle size in the range of from about 0.2 to about 5.0 microns.

10. The solar control film of claim 1 wherein the carbon black particles have an average particle size in the range of from about 0.2 to about 0.5 microns.

11. The solar control film of claim 1 wherein the scratch resistant layer comprises an acrylic resin.

12. The solar control film of claim 11 wherein the acrylic resin is prepared from a mixture of pentaerythritol triacrylate ester and pentaerythritol tetraacrylate ester.

13. The solar control film of claim 1 wherein the acrylic resin is prepared from pentaerythritol tetraacrylate ester, pentaerythritol triacrylate ester and an acrylated epoxy compound.

14. The solar control film of claim 1 wherein the scratch resistant layer has a thickness in the range of from about 0.5 to about 3.0 microns.

15. The solar control film of claim 1 wherein the scratch resistant layer has a thickness in the range of from about 0.8 to about 1.8 microns.

16. The solar control film of claim 1 wherein the solar control film has a visible light transmittance of from about 10% to about 80% and a visible light reflection of from about 0% to about 8%.

17. The solar control film of claim 1 wherein the solar control film has a haze of less than about 7%.

18. The solar control film of claim 1 further comprising a polymeric film between the adhesive layer and the metallized layer.

19. The solar control film of claim 18 wherein the polymeric film is composed of polyethylene ethylene terephthalate.

20. The solar control film of claim 19 wherein the polymeric film includes an ultraviolet absorbent.

21. The solar control film of claim 18 comprising a plurality of metallized layers.

22. The solar control film of claim 21 wherein a polymeric film is located between adjacent metallized layers.

23. A solar control film comprising:
   a) an adhesive layer for adhering the solar control film to a substrate;
   b) a metallized layer; and
   c) a scratch resistant layer containing dispersed carbon black particles wherein the metallized layer is between the adhesive layer for adhering to a substrate and the scratch resistant layer;
   wherein the solar control film has a visible light transmittance of about 10% to about 80%, a visible light reflection of about 0% to about 8%, and a haze of less than about 7%.

24. The solar control film of claim 23, wherein the film comprises no more than two metallized layers.

* * * * *

UNITED STATES PATENT AND TRADEMARK OFFICE
CERTIFICATE OF CORRECTION

PATENT NO.       : 7,057,805 B2                    Page 1 of 1
APPLICATION NO.  : 09/982813
DATED            : June 6, 2006
INVENTOR(S)      : Stephen N. Phillips It is certified that error appears in the above-identified patent and that said Letters Patent is hereby corrected as shown below:

On the cover page, in section (12), change "Phillips et al." to --Phillips--.

On the cover page, in section (75) Inventors, delete "; George L. Quinlan, Bassett, VA (US)".

Signed and Sealed this
Fifteenth Day of March, 2011

David J. Kappos
*Director of the United States Patent and Trademark Office*